(12) United States Patent
Allen

(10) Patent No.: US 8,870,162 B2
(45) Date of Patent: Oct. 28, 2014

(54) METHOD AND APPARATUS FOR INTRODUCING AN ITEM INTO A CONDUIT

(75) Inventor: Jerry L. Allen, Centennial, WY (US)

(73) Assignee: WESCO Distribution, Inc., Pittsburgh, PA (US)

( * ) Notice: Subject to any disclaimer, the term of this patent is extended or adjusted under 35 U.S.C. 154(b) by 213 days.

(21) Appl. No.: 12/661,473

(22) Filed: Mar. 18, 2010

(65) Prior Publication Data
US 2011/0227011 A1 Sep. 22, 2011

(51) Int. Cl.
*H02G 1/08* (2006.01)

(52) U.S. Cl.
CPC ..................... *H02G 1/086* (2013.01)
USPC ....................................... 254/134.4

(58) Field of Classification Search
USPC ........................ 254/134.3 R, 134.4
See application file for complete search history.

(56) References Cited

U.S. PATENT DOCUMENTS

| | | | |
|---|---|---|---|
| 4,185,809 A | 1/1980 | Jonnes | 254/134.4 |
| 4,498,659 A * | 2/1985 | Brockelsby, III | 254/134.4 |
| 4,783,054 A * | 11/1988 | Morel et al. | 254/134.4 |
| 5,587,115 A | 12/1996 | Allen | 264/1.24 |
| 5,922,995 A | 7/1999 | Allen | 174/95 |
| 6,129,341 A * | 10/2000 | Griffioen et al. | 254/134.4 |
| 6,170,804 B1 | 1/2001 | Allen | |
| 6,641,331 B2 * | 11/2003 | Van Bijsterveld | 254/134.3 R |
| 6,712,556 B2 * | 3/2004 | Penza | 254/134.3 R |
| 6,932,323 B2 | 8/2005 | James | |
| 7,100,274 B2 | 9/2006 | Sylvia et al. | |
| 7,740,230 B2 * | 6/2010 | Oberli et al. | 254/134.4 |
| 2010/0071678 A1 | 3/2010 | Allen | |

FOREIGN PATENT DOCUMENTS

| | | | |
|---|---|---|---|
| DE | 73 39 646 | 6/1976 | ............... H02G 1/08 |
| DE | 40 38 156 | 6/1992 | ............... H02G 1/08 |
| DE | 41 12 185 | 10/1992 | ............... H02G 1/08 |
| FR | 2 752 952 A1 | 3/1998 | |
| FR | 2 775 136 | 8/1999 | ............... H02G 1/08 |

OTHER PUBLICATIONS

PCT International Search Report from a related case (dated Feb. 15, 2010—5 pages).
PCT International Search Report and Written Opinion of International Application No. PCT/US2011/000360 (date of mailing Aug. 31, 2011—13 pages).

* cited by examiner

*Primary Examiner* — Hadi Shakeri
(74) *Attorney, Agent, or Firm* — Renner, Kenner, Greive, Bobak, Taylor & Weber

(57) ABSTRACT

A projectile is utilized to introduce an item into a conduit which already has a cable therein. The projectile includes a body member having a longitudinal opening therethrough. The body member is longitudinally split so that the cable may be received in the opening. The item is attached to the body member. When the projectile with a portion of the cable received therein is put into a conduit and air under pressure is introduced into the conduit, the projectile is pushed along the cable and if the cable is undulating in the conduit, it is straightened and positioned out of the way of the item being introduced.

13 Claims, 5 Drawing Sheets

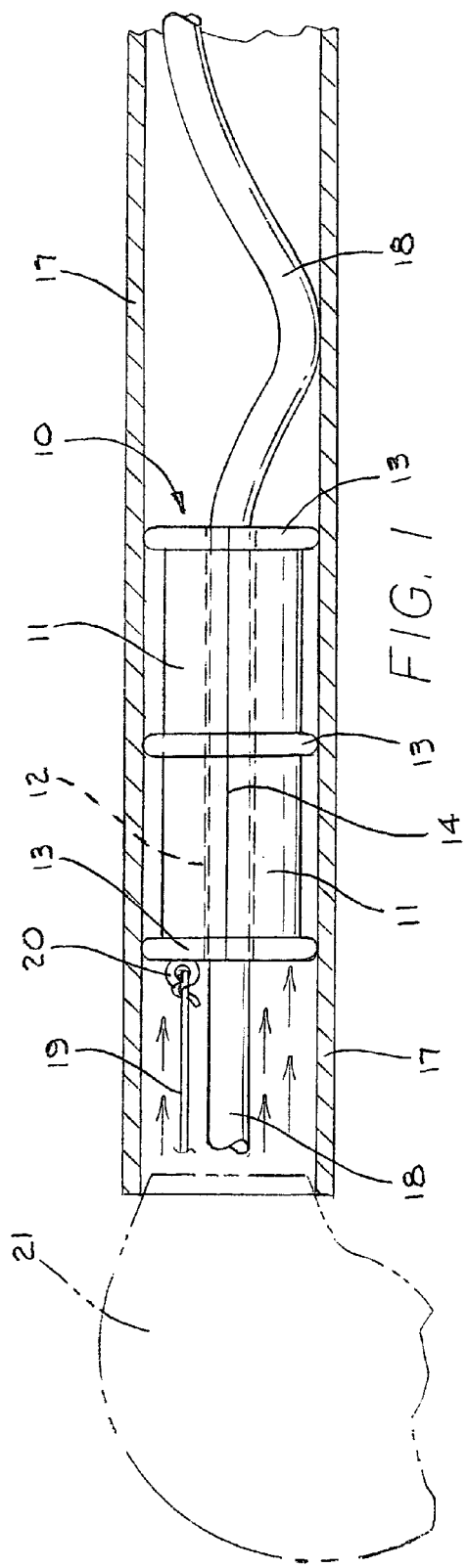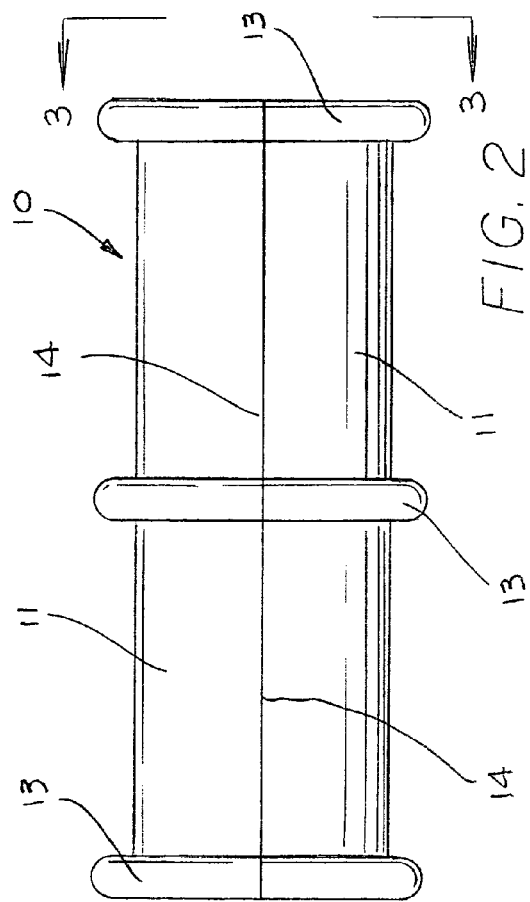

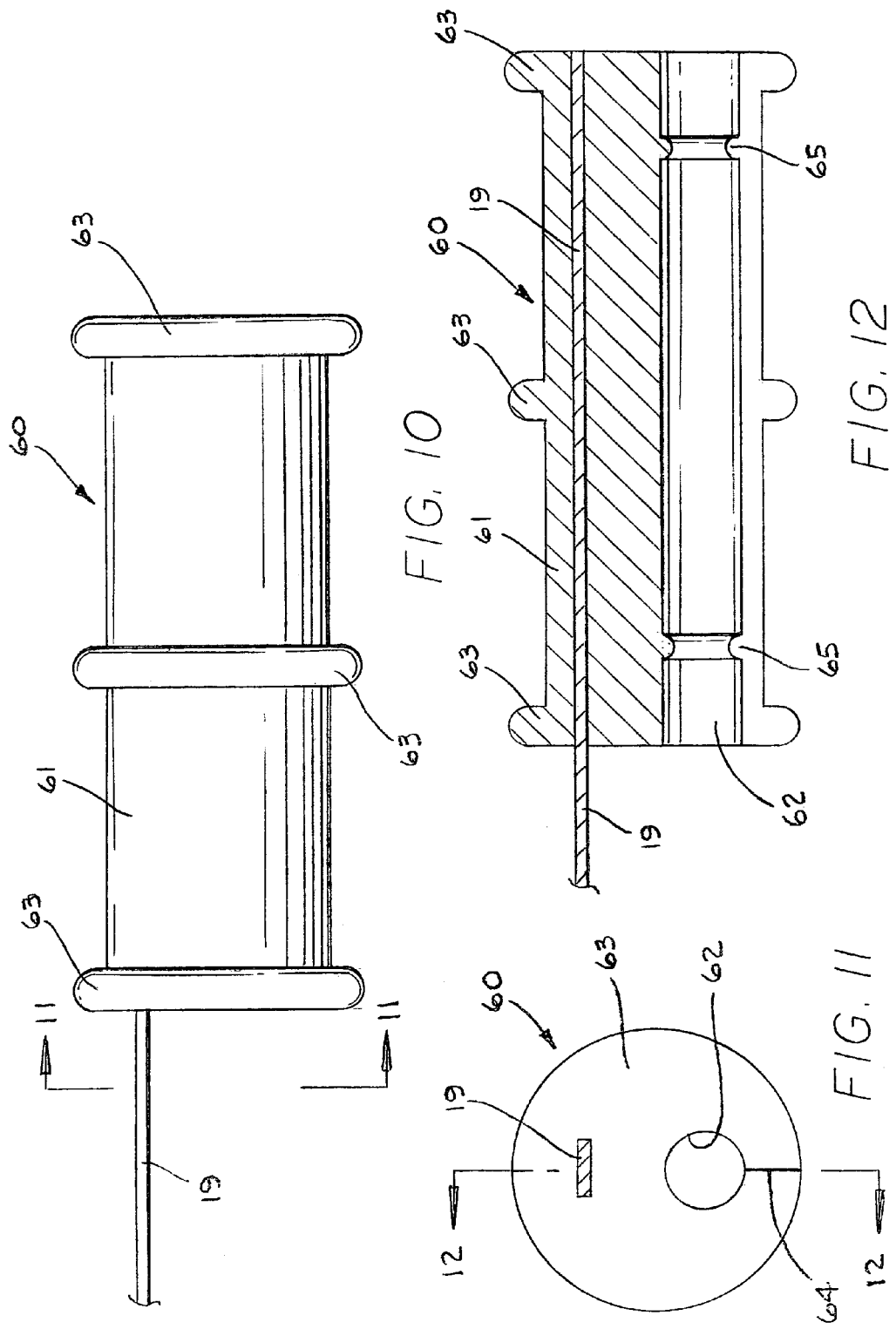

METHOD AND APPARATUS FOR INTRODUCING AN ITEM INTO A CONDUIT

TECHNICAL FIELD

This invention relates to the introduction of items, such as cables, pull tapes, innerducts or the like, into an underground conduit. More particularly, this invention relates to a method and associated apparatus for introducing such an item into a conduit that already has a cable in it.

BACKGROUND ART

The efficient introduction of cables into an underground conduit, which may extend for several thousand feet, has long been a problem. Such conduits are often designed to hold a plurality of cables such as for use in the telecommunications industry. The placing of the first cable in the conduit is the least problematic. Traditionally, the cable is inserted by means of a pushing device, and the insertion may be assisted by a flow of air which is blown into the conduit.

Because the first cable will generally undulate within the conduit, a second cable cannot be readily positioned in the conduit by the same pushing/air blowing procedure. Rather, a pulling mechanism, usually in the form of a tape, must be positioned in the conduit. Then the second cable is attached to the pull tape which is then used to attempt to pull the second cable into the conduit.

While the pull tape is somewhat easier to insert, because of its flexibility compared to a cable, such still represents a somewhat complex procedure. In some instances where the first cable in the conduit is relatively straight, with only minimal undulations, it may be possible to use the air blowing process to insert the tape. However, in the usual situation, the existing cable is undulating in the conduit rendering it more difficult to insert the tape. Moreover, if the tape can be successfully inserted by conventional means, it is often wrapped several times around the existing cable making it difficult, if not impossible, to use the tape to pull another cable into the conduit.

As an alternative to blowing in the pull tape, a rodder system may be utilized. In this system, a relative rigid rod is inserted and finds it way through the cable(s) to the other end of the conduit. Then the pull tape is attached to the rod and the rod is pulled back. These systems are quite expensive to employ as they require multiple, labor intensive, time consuming passes through the conduit using expensive equipment, and even then these systems are normally only effective over short distances.

The need exists, therefore, for a viable alternative to the existing systems when attempting to install an item into a conduit which is already carrying an undulating cable.

DISCLOSURE OF THE INVENTION

It is thus an object of one aspect of the present invention to provide a method of introducing an item into a conduit which is already carrying a potentially undulating cable.

It is an object of another aspect of the present invention to provide the method, as above, which utilizes a projectile to straighten the cable as the item is being introduced into the conduit.

These and other objects of the present invention, as well as the advantages thereof over existing prior art forms, which will become apparent from the description to follow, are accomplished by the improvements hereinafter described and claimed.

In general, in accordance with one aspect of the invention, the method of introducing an item into a conduit which already has a cable therein includes the steps of placing a portion of the cable in a projectile, attaching the item to the projectile, and introducing air under pressure into the conduit. The air under pressure pushes the projectile along the cable and at the same time positions the item in the conduit.

In accordance with another aspect of the invention, the projectile for introducing an item into a conduit which already has a cable therein includes a body member having a longitudinal opening therethrough. The body member is longitudinally split so that the cable may be received in the opening. The body member carriers means which are adapted to attach the item to the body member.

Preferred exemplary devices to perform the method of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a somewhat schematic view of a projectile made in accordance with the present invention shown in a sectioned conduit.

FIG. 2 is an elevational view of a projectile made in accordance with the present invention.

FIG. 10 is an elevational view of another embodiment of a projectile made in accordance with the present invention.

FIG. 11 is a sectional view taken substantially along line 11-11 of FIG. 10.

FIG. 12 is a sectional view taken substantially along line 12-12 of FIG. 11.

PREFERRED EMBODIMENTS FOR CARRYING OUT THE INVENTION

Figure 3:
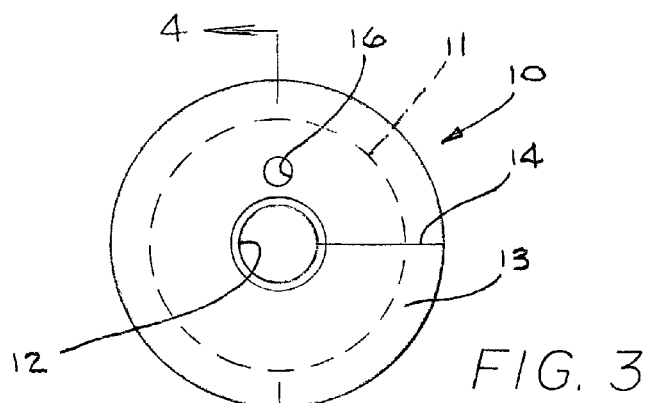
FIG. 3 is an end view of the projectile of FIG. 2 taken substantially along line 3-3 of FIG. 2.
Figure 4:
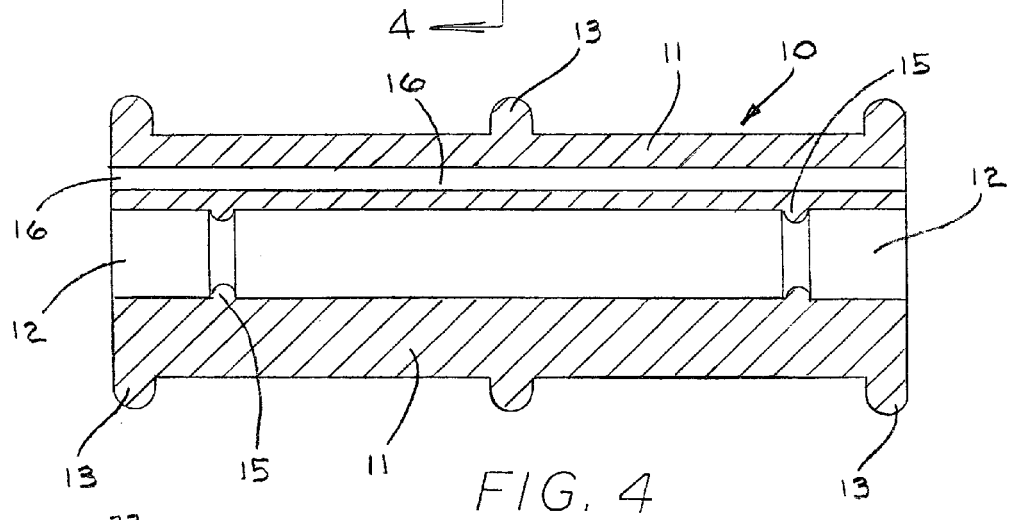
FIG. 4 is a sectional view taken substantially along line 4-4 of FIG. 3.

A projectile made in accordance with one embodiment of the present invention is shown in FIG. 2 and is indicated generally by the numeral 10. Projectile 10 is preferably made of a resilient rubber or synthetic rubber material such as neoprene, polyurethane or the like, and includes a longitudinally extending body member 11. Body member 11 is circular in end profile and is provided with an aperture or opening 12 extending longitudinally therethrough generally at the center or axis of the circular profile. A plurality of circumfertial disks 13 are integrally formed on the outside of body member 11, with three such disks 13 being shown, one at each longitudinal end of body member 11 and one generally centrally of body member 11. Body member 11 and disks 13 are provided with a longitudinal split or slit 14 which extends the entire length of body member 11 thereby splitting body member 11. The slit 14 extends into opening 12 thereby giving radial access to opening 12 merely by flexing the split portions of body member 11 on each side of slit 14 away from each other. As shown in FIG. 4, internally, body member 11 is provided with a plurality of integrally formed circumferential ribs 15 which extend into opening 12. In addition, a bore 16 may extend longitudinally through body member 11 generally adjacent to, and paralleling opening 12.

FIG. 1 shows projectile 10 in use in a conduit 17 having a cable 18, such as a telecommunications cable, positioned therein. Conduit 17 is typically buried underground and carries a live or working cable 18 for several thousand feet between manholes or other access openings at which point the conduit 17 may be interrupted to provide access to the existing working cable 18. As shown in FIG. 1, cable 18 somewhat inherently or typically undulates as it extends through conduit 17 which creates the problems previously described when attempting to insert another item 19 into the conduit 17. Examples of other items 19 might include another cable, a pull tape to be used later to pull another cable into the conduit 17, or a multi-cell inner duct insert such as shown in U.S. Pat. No. 6,251,201. Item 19 is attached to projectile 10 in any suitable fashion such as by means of an eyebolt 20 attached to projectile 10 by being received in bore 16.

Projectile 10 operates to introduce item 19 into conduit 17 in the following manner. With access to a live working cable 18 at a manhole or the like, by virtue of its resilience, body portion 11 of projectile 10 may be spread at split 14 allowing access to opening 12. Opening 12 is preferably designed to be just slightly larger than the diameter of cable 18, and while body portion 11 is spread open at split 14, cable 18 is inserted therein. Body portion 11 is then allowed to resiliently close around cable 18 to its original condition with the ends of body portion 11 at split 14 touching each other as shown in FIG. 2. Item 19 is then attached to eyebolt 20, and projectile 10 is positioned in conduit 17. At that time air under pressure, as from a blower schematically shown at 21, can be introduced into conduit 10. This air acts against the end disk 13 to propel projectile 10 and item 19 through conduit 17. For this purpose, the diameter of disks 13 approximates, and is slightly larger than the inside diameter of conduit 17 so as to provide an air seal therebetween. As projectile 10 moves through conduit 17, cable 18 is forced to straighten as it moves through the opening 12 at the center of projectile 10. As such, cable 18 does not interfere with the item 19 being introduced as shown in FIG. 1.

This system has been found to vary efficiently and easily insert an item 19 for more than two thousand feet through a conduit 17. If any air would happen to leak around the first disk 13, it will encounter the second disk 13, and then possibly the third disk 13. But such leakage would be so minimal as to not adversely effect the efficiency of the system. Moreover, the ribs 15 on the inside of cable opening 12 act against cable 18 to form a seal to prevent air from leaking through opening 12. When projectile 10 has moved through conduit 17 the desired extent, it is removed from cable 12 at another access area, and item 19 is properly in place.

Figure 5:
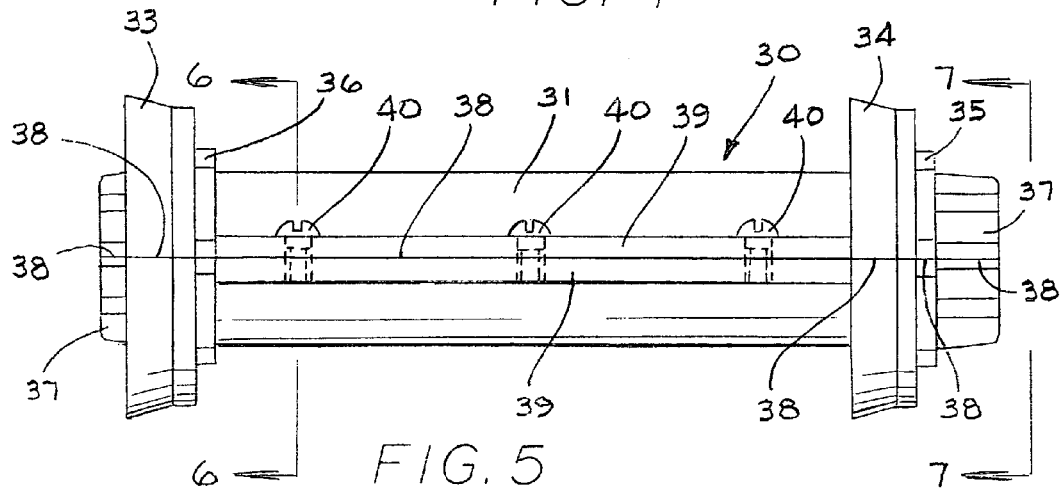
FIG. 5 is an elevational view of another embodiment of a projectile made in accordance with the present invention.
Figure 6:
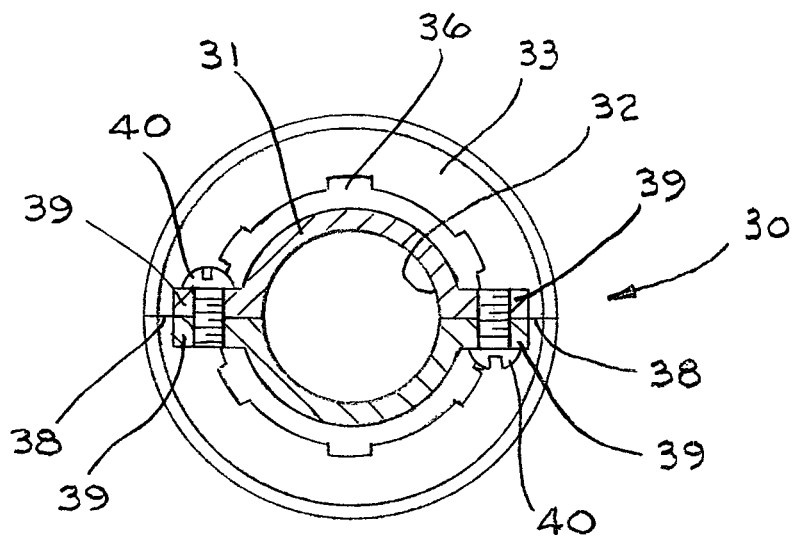
FIG. 6 is a sectional view taken substantially along line 6-6 of FIG. 5.
Figure 7:
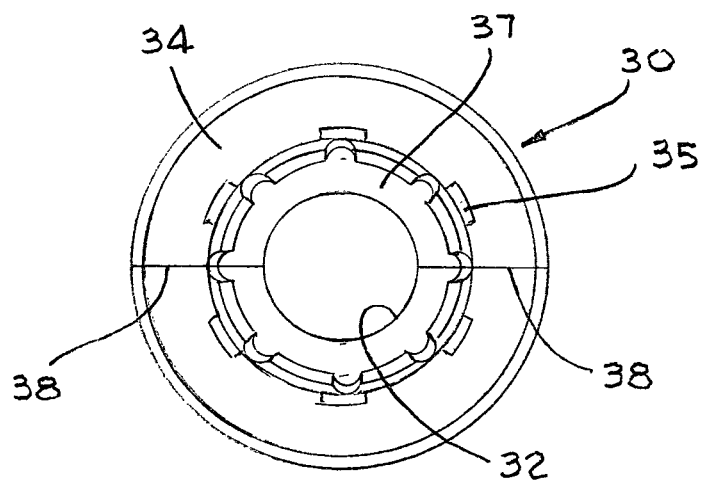
FIG. 7 is an end view of the projectile of FIG. 5 taken substantially along line 7-7 of FIG. 5.

Another embodiment of a projectile according to the present invention is indicated generally by the numeral 30 and is shown in FIGS. 5-8. Projectile 30 includes a longitudinally extending body member 31 which is preferably made of a metallic material. Body member 31 is provided with an aperture or opening 32 extending longitudinally therethrough and carries a plurality (two shown) of circumferential disks or cups 33 and 34. Specifically, as shown in FIG. 5, cup 33 is carried near one end of body member 31 and cup 34 is carried at the other end of body member 31. Cups 33 and 34 are preferably formed from a rubber or synthetic rubber material.

The ends of body member 31 are threaded so that cups 33, 34 may be attached to body member 31. To that end, longitudinally outer castellated nuts 35 (one shown) and inner castellated nuts 36 (one shown) are provided to thread onto body member 31, with the cups 33, 34 being sandwiched between nuts 35 and 36. Doughnut shaped end caps 37 are also threaded into the ends of body member 31 and they engage nuts 35. As a result, cups 33 and 34 are firmly held in place in body member 31.

Body member 31, cups 33, 34, nuts 35, 36 and end caps 37 are provided with a split 38 that extends longitudinally along body member 31 and through cups 33, 34, nuts 35, 36, and end caps 37. Thus, each of these components is provided in two halves or portions which are attachable to each other to provide the assembled projectile 30, and which are detachable from each other to provide radical access to opening 32. Each half of body member 31 is provided with diametrically opposed flanges 39 at the location of split 38. Flanges 39 of each half of body member are positioned adjacent to each other and are connected by suitable fasteners 40. Similar attachment mechanisms (not shown) may be employed for nuts 35, 36 and end caps 37. However, the split 38 in cups 33 and 34 need not be attached because they are formed of the resilient material.

Projectile 30 operates in much the same manner as projectile 10 to introduce an item 19 into conduit 17. Thus, with access to a working cable 18, and with split body member 31 and its associated elements open, the cable 18, is laid into opening 32 which is designed to be approximately the same size (only slightly larger) than cable 18. Body member 31 is then closed and locked in place via fasteners 40. Cups 33 and 34 are then secured in place, as previously described. An item 19 to be inserted into conduit 17 may be attached to projectile 30 in any suitable fashion, and the projectile 30 may be inserted into conduit 17 to be moved, by air under pressure from blower 21, through conduit 17. Specifically, that air is received by cup 33 which has a diameter slightly larger than the inside of conduit 17 so as to provide an air seal therebetween. If air would leak past cup 33, cup 34 acts as a second air receiving seal. The air pressure against cups 33 and 34 thus propels projectile 30 through conduit 37, with cable 18 moving through opening 32. Cable 18 will thus be straightened and moved out of the way of item 19.

Figure 8:
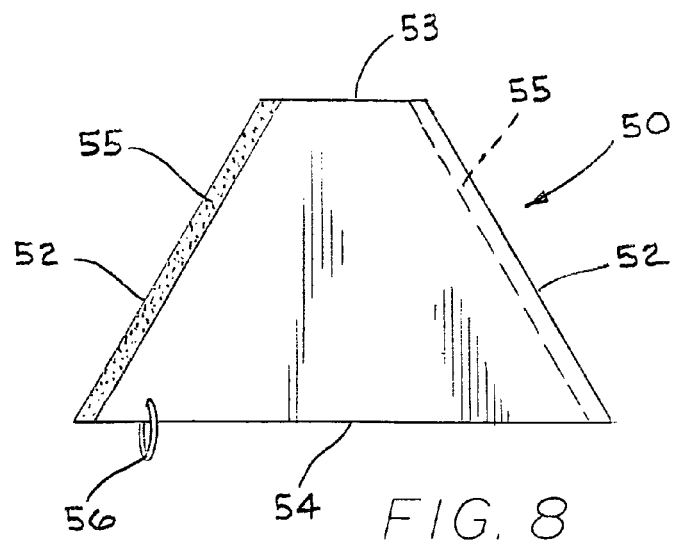
FIG. 8 is a somewhat schematic unassembled elevational view of another embodiment of a projectile made in accordance with the present invention.
Figure 9:
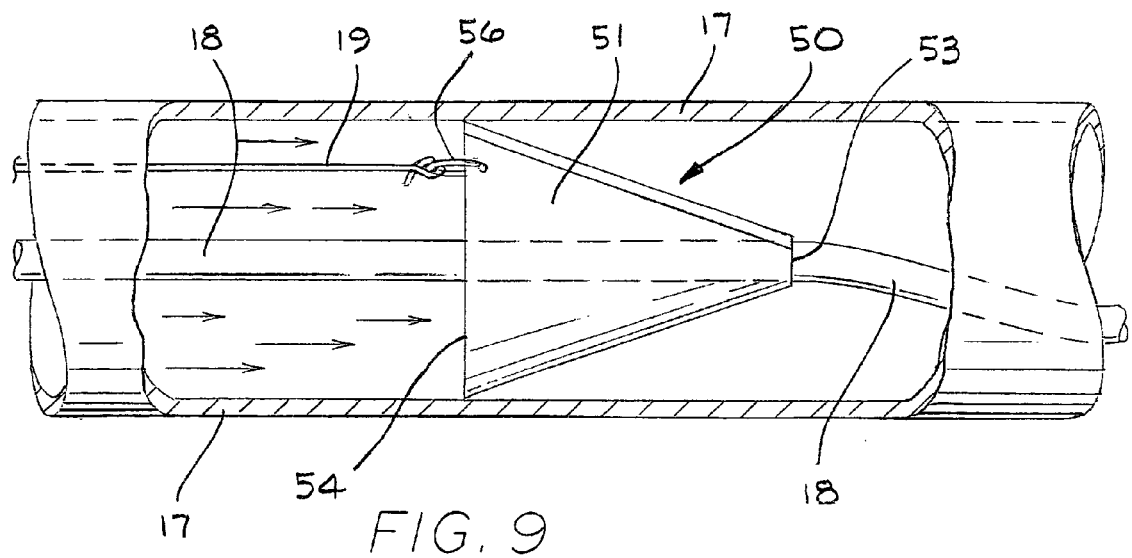
FIG. 9 is a somewhat schematic view of the projectile of FIG. 8 shown in a sectioned conduit.

An additional embodiment of a projectile according to the present invention is shown in FIGS. 8 and 9 and is indicated generally by the numeral 50. Projectile 50 consists of a body member formed from a sheet of sturdy fabric material and as shown in FIG. 9 is in the shape of a truncated cone having a longitudinal opening 51 therein. Projectile 50 is slit or split, as at edges 52 shown in FIG. 8 where projectile 50 is shown in an unassembled condition. As such, when laying flat, the fabric sheet of projectile 50 takes on the shape of a trapezoid having parallel top and bottom edges 53 and 54, respectively, and side split edges 52. To assembly projectile 50, edges 52 may be attached by any suitable means such as adhesive or by mating VELCRO® strips 55 positioned on edges 52 and 53.

Projectile 50 operates much like projectiles 10 and 30 to introduce an item 19 into conduit 17. Thus, with access to a working cable 18 and with projectile edges 52 unattached, fabric projectile 50 is wrapped around cable 18 and edges 52 are attached to each other. As shown in FIG. 9, the top edge 53 of fabric projectile 50 is generally of a size equal to or slightly smaller than the circumference of cable 18 such that projectile 50, at the mouth of opening 51, rather tightly engages cable 18. The bottom edge 54 of projectile 50 is generally of a size slightly larger than the inner circumference of conduit 17 such that when inflated by air under pressure from blower 21, as shown in FIG. 9, the edge 54 engages the inside of conduit 17. Item 19 may be attached to projectile 50, as by a ring 56, and thus as projectile 50 is propelled through conduit 17, item 19 is inserted next to cable 18, which passes through the center of projectile 50 as it is propelled. While it is possible a slight amount of air under pressure may leak between the mouth of opening 51 at projectile edge 53 and cable 18, the large surface area provided by the inside of projectile 50 will provide sufficient force to propel projectile 50 under most circumstances.

Under most operating conditions, the projectiles 10, 30 and 50 just described can efficiently position an item 19 into conduit 17 without interference by the cable 18. However, in situations of high turbulence in the conduit, projectiles 10, 30 or 50 could want to spin on cable 18. If such were to occur, the item 19 carried thereby could adversely find itself rapped around the cable 18. The embodiment of the invention shown in FIGS. 10-12 is designed to prevent such an occurrence if turbulent conditions are encountered.

Like projectile 10, projectile 60 of the embodiment shown in FIGS. 10-12 is a one-piece or unitary item made of a resilient rubber or synthetic rubber material such as neoprene, polyurethane or the like. Projectile 60 includes a one-piece longitudinally extending body member 61 having a generally circular end profile. Body member 61 is provided with an aperture or opening 62 extending longitudinally therethrough. Unlike opening 12 in projectile 10, however, opening 62 is not located on the axial center of body member 61 but rather is radially off center of the axis of body member 61.

Like projectile 10, body member 61 of projectile 60 includes a plurality of circumfertial disks 63 are integrally formed on the outside of body member 61, with three such disks 63 being shown, one at each longitudinal end of body member 61, and one generally centrally of body member 61. Body member 61 and disks 63 are provided with a longitudinal split or slit 64 which extends the entire length of body member 61 thereby splitting body member 61. The slit 64 extends into opening 62 thereby giving access to opening 12 merely by flexing the split portions of body member 61 on each side of slit 64 away from each other. As shown in FIG. 12, body member 61 is internally provided with a plurality of integrally formed circumferential ribs 65 which extend into opening 62.

The embodiment of FIGS. 10-12 also demonstrates that instead of physically attaching the item to be inserted to the project, the item 19, shown in FIGS. 10-12 to be in the form of a pull tape, may be attached to body member 61 by being molded directly therein. Such avoids the need for other attachment devices, such as eyebolt 20 of the embodiment of FIGS. 1-4. In fact, item 19 could be molded into body member 11 of that embodiment, if desired.

Projectile 60 is utilized to introduce item 19 into conduit 17 is much the same manner as the other embodiments. Thus, body member 61 is opened at slit 64 and the cable 18 is inserted into opening 62. Body member 61 then closes and air under pressure causes projectile 60, with its integrally formed tape item 19, to move along cable 18. But because opening 62 is off center, cable 18 will not allow projectile 60 to spin and item 19 cannot wrap around cable 18.

In view of the foregoing, it should be evident that any of the projectiles described herein will accomplish the objects of the invention and otherwise substantially improve the art.

What is claimed is:

1. A projectile for introducing an item into a conduit which already has a cable therein comprising a body member formed from a sheet of fabric material defining the shape of a trapezoid having parallel top and bottom edges and side split edges when unassembled, means for attaching said split edges thus forming a truncated cone having a longitudinal opening extending between said top and bottom edges for receiving said cable, and means carried by said body member for attaching the item to the body member.

2. A projectile for introducing an item into a conduit which already has a cable therein comprising a body member having a circular profile along its entire length and having a central longitudinal axis and a longitudinal opening therethrough not on said axis, said body member being longitudinally split from one side to said longitudinal opening along its entire length so that the cable may be received in said opening, means carried by said body member for engaging the conduit, and ribs integrally formed with said body member and extending into said opening, said ribs being adapted to engage the cable, said body member thereby carrying the item to be introduced into the conduit without allowing the item to wrap around the cable.

3. The projectile of claim 2 wherein said means is in the form of a plurality of disks integrally formed with said body member.

4. The projectile of claim 2 wherein said means is in the form of a plurality of cups carried by said body member.

5. The projectile of claim 2 wherein said body member is made of a resilient material.

6. A method of introducing an item into a conduit which already has a cable therein comprising the steps of placing a portion of the cable into an opening in a one-piece projectile having a centrally longitudinally extending axis, the opening being offset from the axis, the projectile comprising a body member having a circular profile along its entire length, said body member being longitudinally split from one side to said opening so that the cable may be received in said opening, means carried by said body member for engaging the conduit, and ribs integrally formed with said body member and extending into said opening, said ribs being adapted to engage the cable, said body member thereby carrying the item, and introducing air under pressure into the conduit thereby pushing the projectile along the cable without allowing the projectile to rotate and at the same time positioning the item in the conduit without allowing the item to wrap around the cable.

7. The method of claim 6 further comprising the step of utilizing the one-piece projectile to seal the interface of the cable and the projectile so that the projectile is not allowed to rotate.

8. The method of claim 7 further comprising the step of utilizing the one-piece projectile to seal the interface of the conduit and the projectile so that the projectile is not allowed to rotate.

9. The method of claim 6 wherein the step of placing includes the step of opening the projectile at the split and thereafter allowing the split ends to touch each other.

10. The method of claim 6 wherein said means for engaging the conduit includes providing the projectile with a plurality of disks with the air under pressure acting on the disks to push the projectile along the cable, and utilizing the disks to seal the interface between the conduit and the projectile so that the projectile is not allowed to rotate.

11. The method of claim 6 wherein said means for engaging the conduit includes providing the projectile with a plurality of cups with the air under pressure acting on the cups to push the projectile along the cable, and utilizing the cups to seat the interface between the conduit and the projectile so that the projectile is not allowed to rotate.

12. The method of claim 6 further comprising the step of utilizing the ribs to seal the interface between the cable and the projectile so that the projectile is not allowed to rotate.

13. The method of claim 6 wherein the step of pushing includes the step of straightening the cable.

* * * * *